H. S. HUBBELL.
CHUCK.
APPLICATION FILED DEC. 20, 1909.
1,038,755.
Patented Sept. 17, 1912.
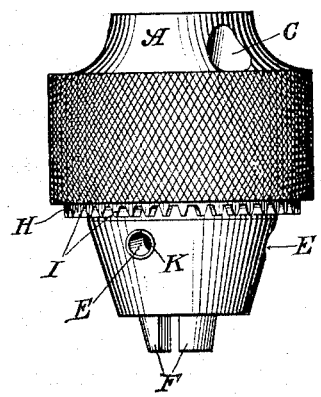
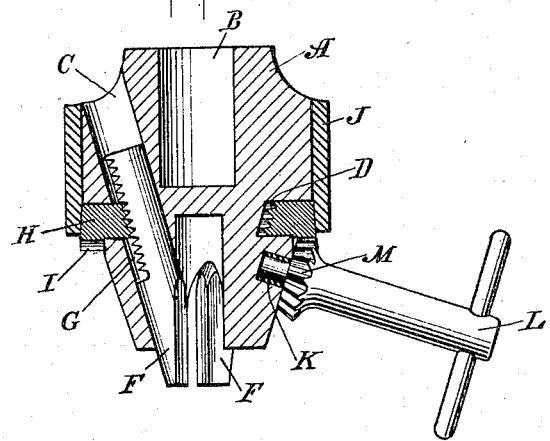
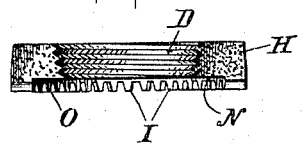
WITNESSES:
G. V. Rasmussen
John A. Kellenbeck
INVENTOR
Henry S. Hubbell
BY
Briesen & Knauth
ATTORNEYS

UNITED STATES PATENT OFFICE.

HENRY S. HUBBELL, OF ASHBURNHAM, MASSACHUSETTS.

CHUCK.

1,038,755.

Specification of Letters Patent.  Patented Sept. 17, 1912.

Application filed December 20, 1909. Serial No. 534,012.

*To all whom it may concern:*

Be it known that I, HENRY S. HUBBELL, of Ashburnham, county of Worcester, State of Massachusetts, have invented certain new and useful Improvements in Chucks, of which the following is a specification.

My invention relates to a chuck known as a drill chuck and more particularly to a drill chuck of the type known as the Almond chuck wherein the jaws are slidably movable in inclined recesses drilled into the said body of the chuck, the relative movement of the jaws being controlled by a ring having an internally screw-threaded tapering face, the threads of which mesh with external threads upon the jaws.

The object of my invention is to construct a strong and durable chuck of this nature which is provided with reliable means for bringing great force or power to bear upon the rotation of the ring, whereby the tool is securely and very tightly gripped between the jaws of the chuck.

A preferred form of my invention is illustrated in the accompanying drawings in which—

Figure 1 is a side view of my chuck; Fig. 2 is a sectional view through said chuck; and Fig. 3 is a side view of one of the two halves of the split ring which operates and controls the movement of the jaws.

The body A of the chuck is solid, but has formed therein a socket B, the large recesses C, the annular nut recess D and the key recesses E. The said body A is made much wider at the upper part thereof than at the lower portion and particularly is this the case at that point of the chuck immediately above the nut recess D as compared with that portion of the chuck immediately below the recess. Chucks of this nature comprise the usual three jaws F screw-threaded externally at G and controlled by a ring H which in the construction illustrated, takes the form of a split ring, one-half of which is shown in Fig. 3. This split ring is made of hardened tool steel and carries the teeth I. The split ring is connected to and held in place by the sleeve J which is itself adapted to be rotated upon the chuck body and which is made of considerably softer material than the nut. As shown in the drawing, the sleeve J is provided with a slight internal taper conforming to a similar taper on the ring H and the connection between the sleeve and ring is made by sweating, although I do not confine myself to this mode of making the connection. A hardened bushing K is placed in each of the key recesses. The end of the key L is adapted to be inserted in the bushing K of the pinion holes E and carries a pinion M adapted to mesh with the hard teeth on the split nut. These teeth are permitted to project as shown in Fig. 1 below the edge of the sleeve J. The upper surface of the nut H is smooth and is adapted to bear to its full extent against the smooth upper surface of the nut recess D. The lower surface of the nut comprises three operative parts; first, the smooth underside N which bears to its full extent upon the smooth surface of the lower side of the nut recess D, although said nut recess at this point is considerably smaller in diameter than the upper portion of the same nut recess; second, the smooth internal face O which coincides with the diameter of the chuck body at this point; and third, the teeth I.

From the above description it will be seen that the area of the upper surface of the nut recess and the diameter of the chuck body upwardly from said point is considerably larger than the area of the lower surface of the nut recess and of the chuck body below said point. It will also be seen that the front edge of the sleeve J lies in approximately the same plane as the lower surface of the nut recess D. This together with the comparatively large bulk of the upper portion of the chuck body and the comparatively narrow and light lower portion of the chuck body makes a strong and stocky device wherein the centrifugal force is accentuated at the upper portion of the chuck and permitted gradually to diminish toward the slender tool usually employed in connection with these chucks.

Having thus described my invention, what I claim is:

1. A drill chuck comprising a body provided with an annular recess, the body portion above said recess being cylindrical and that below said recess being conical and the diameter of said conical portion immediately adjacent said recess being substantially less than that of the cylindrical portion, an internally threaded nut in said recess having dependent teeth peripherally arranged as to said conical portion, a sleeve embracing and connected to said nut and adapted to be rotated upon the aforesaid cylindrical body portion the bottom of said sleeve being above said dependent teeth, externally threaded jaws movable in said chuck body and engaged by the internal threads of said nut, and means upon said chuck body adapted to be engaged by mechanism to operate the teeth upon said nut.

2. A drill chuck comprising a body provided with an annular recess, the body portion above said recess being cylindrical and that below said recess being conical and the diameter of said conical portion immediately adjacent said recess being substantially less than that of the cylindrical portion, an internally threaded nut in said recess having dependent teeth arranged between the periphery of said nut and the periphery of said conical portion adjacent to said nut, a sleeve embracing and connected to said nut and adapted to be rotated upon the aforesaid cylindrical body portion the bottom of said sleeve being not lower than the bottom surface of said nut, externally threaded jaws movable in said chuck body and engaged by the internal threads of said nut, and means upon said chuck body adapted to be engaged by mechanism to operate the teeth upon said nut.

In witness whereof I have hereunto set my hand in the presence of two subscribing witnesses.

HENRY S. HUBBELL.

Witnesses:
WALTER B. CLIFFORD,
CARLETON H. HUBBELL.